United States Patent [19]

Benko et al.

[11] Patent Number: 4,605,696

[45] Date of Patent: Aug. 12, 1986

[54] ENHANCED ADHESION OF RUBBER TO REINFORCING MATERIALS THROUGH THE USE OF PHENOLIC ESTERS

[75] Inventors: David A. Benko, Munroe Falls; Syed K. Mowdood, Akron; Paul H. Sandstrom, Tallmadge; Walter H. Waddell, III, Akron; Lawson G. Wideman, Tallmadge, all of Ohio

[73] Assignee: The Goodyear Tire & Rubber Company, Akron, Ohio

[21] Appl. No.: 781,081

[22] Filed: Sep. 27, 1985

[51] Int. Cl.[4] .............................................. C08L 61/12
[52] U.S. Cl. ................................... 524/432; 152/450; 524/509; 524/511; 524/541; 525/136; 525/137; 525/139; 525/141; 525/480

[58] Field of Search ............... 525/136, 137, 139, 141, 525/480; 524/432, 509, 511, 541

[56] References Cited

U.S. PATENT DOCUMENTS 3,638,702  2/1972  Endter ................................ 525/139
3,951,887  4/1976  Tanimura et al. .................. 525/136

Primary Examiner—Theodore E. Pertilla
Attorney, Agent, or Firm—D. O. Nickey

[57] ABSTRACT

There is disclosed a method for adhering rubber to reinforcing materials which comprises embedding a textile fiber or metal reinforcing material in a vulcanizable rubber composition comprising rubber, a vulcanizing agent, reinforcement, a methylene donor, and a phenolic ester as a methylene acceptor.

19 Claims, No Drawings

ENHANCED ADHESION OF RUBBER TO REINFORCING MATERIALS THROUGH THE USE OF PHENOLIC ESTERS

TECHNICAL FIELD

This invention relates to the use of phenolic esters as a substitute for resorcinol for the in situ or preformed resins utilized in rubber compositions. This invention also relates to a vulcanizable rubber composition which forms a strong adhesive bond with reinforcing materials and has highly desirable physical properties.

BACKGROUND OF THE INVENTION

It has been conventional practice to prepare various textile reinforcing fibers to be used in contact with rubber formulations by pretreating them with a mixture of a rubber latex and a phenol-formaldehyde resin in which the phenol has almost always been resorcinol. This is the so called "RFL" (resorcinol-formaldehyde-latex) method. Another method commonly used is to generate the resin in situ (in the vulcanized rubber/textile matrix) by incorporating in the rubber a formaldehyde (or methylene) donor compound, for example, hexamethylenetetramine or hexamethoxymethylmelamine and a formaldehyde (or methylene) acceptor compound, for example, a dihydroxybenzene compound such as resorcinol. The in situ method has been found to be particularly effective where the reinforcing material is brass coated steel wire since pretreatment of the wire with the RFL system has been observed to be largely ineffective.

The in situ formed resins have been observed to enhance adhesion between the rubber and the reinforcing material. This enhancement of adhesion is by a mechanism that is not completely understood. The in situ method which entails compounding a vulcanizable rubber stock with the phenol-formaldehyde components is known in the art. The most commonly employed methylene acceptor is resorcinol, while the more commonly employed methylene donors are the N-substituted oxymethylmelamines. The resin is formed in situ during vulcanization of the rubber creating a bond between the fiber and the rubber irrespective of whether the fiber has been pretreated or not.

The use of resorcinol has some inherent properties which can be disadvantageous. One of the most frequently encountered is occasioned by the fact that resorcinol is not readily dispersed in rubber. In addition, resorcinol in its raw form is excessively volatile. These disadvantages are further enhanced because, on occasion, there is a worldwide shortage of resorcinol.

The rubber industry utilizes resorcinol in conjunction with methylene donors to form resins which are used in rubber compounds to enhance filamentary reinforcement and to improve the physical properties, including aged physical properties, of tires and other compounded rubber formulations. These resins, whether preformed or formed in situ, can increase the dynamic rubber stiffness, tire treadwear, interfacial adhesion, and fabric adhesion to the rubber compound; while desirably maintaining the values of and hopefully reducing the rolling resistance and heat build-up of a tire.

In spite of numerous attempts to replace resorcinol, no direct resorcinol replacement or single resin system substitute is known to be used in the manufacture of commercial rubber products to date.

An aspect of the instant invention resides in the use of specific phenolic esters as the methylene acceptor which has unexpectedly been observed not to substantially interfere with the curing of the rubber and has further unexpectedly been observed to enhance the physical properties of the final rubber vulcanizate. In general, the instant invention provides a new and improved vulcanizable rubber stock which avoids certain disadvantages of employing resorcinol as the methylene acceptor, as well as providing equal or better rubber to reinforcement bonding results.

U.S. Pat. No. 3,517,722 discloses a pneumatic tire comprising polymer, a methylene donor, a methylene acceptor, wherein the methylene donor and acceptor may be in free or complex form, with about 0.5 to about 1.5 parts by weight of sulfur wherein the methylene donor is selected from the group consisting of hexamethylenetetramine and complexes thereof, N-(substituted oxymethyl) derivatives of urea, N-(substituted oxymethyl) melamine derivatives and azomethyne compounds.

U.S. Pat. No. 4,338,263 is concerned with vulcanizable rubber compositions providing enhanced bonding of textile or metal reinforcing fibers thereto which comprises a rubber, a filler material, and an N-(substituted oxymethyl) melamine, and a 4,4'-isopropylidenediphenol reaction product or solution.

U.S. Pat. No. 3,586,735 discloses the use of Bisphenol A in a resin which is added to rubber.

U.S. Pat. No. 4,339,359 discloses a method for adhering rubber to reinforcing materials which comprises embedding a textile fiber or metal reinforcing material in a vulcanizable rubber composition comprising rubber, a sulfur vulcanizing agent, high surface area silica and an N-(substituted oxymethyl)melamine compound, thus apparently eliminating resorcinol or other methylene acceptor compounds.

U.S. Pat. No. 3,992,334 discloses a vulcanizable rubber composition which comprises rubber, a filler, an N-(substituted oxymethyl)melamine and a 1,3-dimethylolurea.

U.S. Pat. No. 4,038,220 discloses a vulcanizable rubber composition which comprises rubber, a filler, an N-(substituted oxymethyl)melamine and at least one of alpha or beta naphthol.

U.S. Pat. Nos. 2,571,703 and 2,588,978 relate to processes for the production of resorcinol monobenzoate. Resorcinol monobenzoate is presently available on a commercial scale.

None of the prior art suggests or discloses that the resorcinol component of the resin used in RFL adhesive systems or as in situ resins in rubber, may be replaced by phenolic esters such as resorcinol monobenzoates or resorcinol rosinates.

DISCLOSURE OF THE INVENTION

There is disclosed a sulfur vulcanizable rubber composition comprising rubber, a vulcanizing agent, and the reaction product of (A) a methylene donor and (B) a methylene acceptor selected from at least one compound of the general structural formula I:

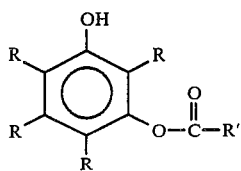 (I)

wherein R may be the same or different radicals selected from the group consisting of hydrogen, halogen, alkyl of 1 to 18 carbon atoms, alkoxy of 1 to 18 carbon atoms, and hydroxyl:

wherein R' is a hydrocarbon radical, saturated or unsaturated, of 2 to 20 carbon atoms or an aromatic radical of the structural formula:

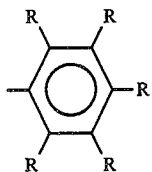

wherein R is defined as above;
or a radical of the structural formula:

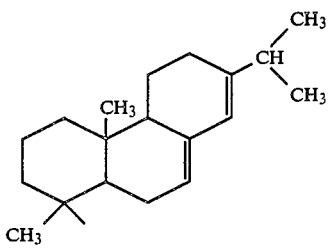

The rubber composition of this invention when vulcanized exhibits excellent adhesion to textile fiber or metal reinforcing cords embedded therein.

There is also disclosed a composition for the adhesion of a textile fiber or a steel cord to rubber which consists essentially of (1) a vulcanizable natural or synthetic rubber, (2) a sulfur vulcanizing agent, (3) from about 0.5 to about 50 parts by weight per 100 parts by weight of rubber of a methylene donor, and (4) from about 0.5 to about 50 parts by weight per 100 parts by weight of rubber of a phenolic ester methylene acceptor compound represented by the formula:

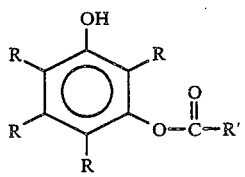

wherein each R represents, individually, hydrogen, halogen, alkyl of 1 to 18 carbon atoms, alkoxy of 1 to 18 carbon atoms or hydroxyl, and wherein R' is a hydrocarbon radical, saturated or unsaturated, of 2 to 20 carbon atoms or an aromatic radical of the structural formula:

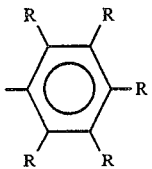

wherein R is defined as above; or a radical of the structural formula:

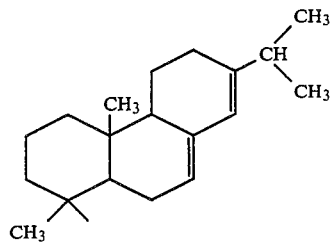

Representative of the compounds of formula I that are most useful in this invention are: resorcinol monobenzoate, resorcinol rosinates, and phloroglucinol mono-rosinate.

The amount of phenolic ester included in the rubber composition may be from about 0.5 to about 50 parts by weight per 100 parts by weight rubber, preferably from 1.0 to 10 parts by weight per 100 parts by weight of rubber. The weight ratio of methylene donor to phenolic ester can range from about 1:10 to about 10:1 with 1:1 to 4:1 being preferred.

Rubber compositions which can be used include compositions based on natural and/or synthetic rubber such as butadiene/styrene copolymers, cis-1,4-polyisoprene, polybutadiene, polychloroprenes, nitrile and ethylene/propylene copolymers, terpolymer rubbers such as ethylene/propylene/diene terpolymer rubbers, polyepichlorhydrin terpolymers, acrylic and fluoro elastomers, unsaturated and saturated block polymers and blends thereof.

The rubber being bonded to the reinforcing material may be any rubber used in the manufacture of tires, belts or hoses. The rubber vulcanizate which is bonded to the textile, fiber or steel wire will contain conventional compounding ingredients such as carbon black, antidegradants, sulfur, zinc oxide, accelerators, silica, processing and softening oils and the like.

There is also disclosed a composite of the rubber composition of this invention containing reinforcement therefor as a filament or filaments in the form of a cord where said filament is composed of at least one organic fiber selected from polyester, nylon and aramide or an inorganic fiber selected from glass and brass plated steel.

The invention is also directed to the rubber composition of this invention and to said rubber composition/reinforcement composite where said rubber is cured.

Compounds which are included in the vulcanizable composition and which are capable of reacting with the resorcinol monobenzoate or rosinate are compounds which are capable of donating methylene groups or aldehydes (methylene donor). A particularly suitable compound which is capable of liberating methylene groups is hexamethylenetetramine, although other compounds, e.g. hexamethoxymethylmelamine, lauryloxymethylpyridinium chloride, ethyloxymethylpyridinium chloride, trioxan hexamethylolmelamine, the hydroxyl groups of which may be esterified or partly etherified, and polymers of formaldehyde such as paraformaldehyde can be used.

The N-substituted oxymethylmelamines which can serve as the methylene donors when combined with the resorcinol monobenzoate or rosinate compounds have the following general formula:

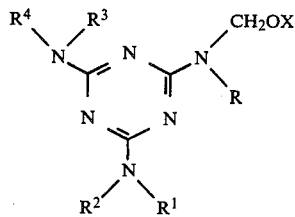

wherein X is lower alkyl (1-8 carbon atoms); R, R$^1$, R$^2$, R$^3$ and R$^4$ are individually hydrogen, lower alkyl having from 1 to 8 carbon atoms, the group -CH$_2$OX or their condensation products. Specific illustrative species include hexakis(methoxymethyl)melamine, N,N',N''-trimethyl N,N',N''-trimethylolmelamine, hexamethylolmelamine, N,N',N''-trimethylolmelamine, N-methylolmelamine, N,N'-dimethylolmelamine, N,N'N''tris(methoxymethyl) melamine and N,N',N''tributyl-N,N',N''-trimethylol- melamine. A very useful methylene donor is hexamethoxymethylmelamine. The N-methylol derivatives of melamine are prepared by known methods.

The resorcinol rosinates, like resorcinol monobenzoates, are esters of phenolics. By phenolics is meant a class of aromatic organic compounds in which one or more hydroxy groups are attached directly to the benzene ring. The resorcinol rosinates are the reaction product of resorcinol with resin acids. Resin acids are monocarboxylic acids having the typical molecular formula C$_{20}$H$_{30}$O$_2$. Resin acids are obtained from rosin. Rosin is a solid resinous material that occurs naturally in pine trees.

Chemical treatment of rosins, such as hydrogenation, dehydrogenation, or polymerization are known which produce modified resins.

A reaction product or solution of the methylene donor and the phenolic esters are incorporated into the rubber in an amount from 0.5 to 50 parts per hundred of rubber, preferably 1 to 10 parts per hundred of rubber. The weight ratio of the methylene donor to phenolic ester can range from 1:10 to 10:1. The methylene donor and phenolic ester can be added to the rubber in amounts and by means that are known to rubber compounders. A general method of making the rubber vulcanizate is to mix the rubber, carbon black, zinc oxide, lubricants and the solution or reaction product of the methylene donor and the phenolic ester, in a Banbury mixer at a temperature of about 150° C. The resulting masterbatch is then compounded on a standard two-roll rubber mill with sulfur and accelerators. The vulcanizable composition is then shaped, placed in contact with the reinforcing material, i.e. fiber cord or steel wire, and then vulcanized.

The following examples are provided for illustrative purpose and should not be considered as limiting the invention. The parts and percentages are by weight unless otherwise indicated.

EXAMPLE 1

Evaluation of Resorcinol Alternatives

Numerous phenolic derivatives were screened by thermogravimetric analysis to determine volatility at compound mixing temperatures. Pure compounds were examined and, based on the percent weight loss at Banbury temperatures (140° to 180° C.), possible resorcinol alternatives were rated. Table I sets out a listing of numerous potential resorcinol alternatives and provides percent weight loss at 140°, 160° and 180° C.

TABLE I

| | Data of Volatility | | |
|---|---|---|---|
| | % Weight Loss at | | |
| Compound Structure | 140° C. | 160° C. | 180° C. |
| (OH, OH resorcinol) | 7 | 18 | 46 |
| (OH, OCH$_3$) | 45 | 82 | 100 |
| (OH, O-CO-CH$_3$) | 14 | 25 | 50 |
| (OH, O-CO-phenyl) | 0 | 1 | 3 |
| (CH$_3$O, OCH$_3$) | 96 | 100 | 100 |
| (phenyl-O, O-phenyl) | 100 | 100 | 100 |
| (OH, OH, OH phloroglucinol) | 22 | 22 | 22 |
| (OCH$_3$, OCH$_3$, CH$_3$O) | 24 | 62 | 100 |
| (rosinate with OH phenyl) | 4 | 5 | 7 |
| (rosinate with OH, OH phenyl) | 6 | 9 | 12 |

Data on the potential candidates show a continual loss in weight upon heating which is thought to correspond to a physical transition, i.e. sublimation/vaporization. The analysis of the adducts was performed in a nitrogen atmosphere. A constant nitrogen flow rate of 40 ml/min was utilized.

From the data presented in Table I it is evident that many resorcinol derivatives are more volatile than resorcinol. From this investigation only resorcinol monobenzoate, 1,3,5-trihydroxybenzene, and the rosinates of resorcinol and 1,3,5-trihydroxybenzene were less volatile than resorcinol. Volatility of the methylene acceptor at rubber processing temperatures is only one parameter that must be considered; the other is the ability of the methylene acceptor to form the resin.

EXAMPLE 2

Resin Evaluation

To evaluate resin forming ability and volatility of the resulting resin, a procedure similar to that described in Example 1 was utilized except that percent weight loss of 3:1 mole ratio mixtures of phenolic derivatives (PD) to a methylene donor was determined at 400° C. Thus, the phenolic derivatives were combined with the methylene donors hexamethylenetetramine (hexa) or hexamethoxymethylmelamine (melamine) at a 3 to 1 mole ratio, phenolic derivative to methylene donor. The samples were prepared and then analyzed by increasing the temperature 5° C./min until 400° C. was attained and then the percent weight remaining was recorded. Table II sets out the data.

TABLE II

| | Volatilities of Resulting Resins | |
|---|---|---|
| | Percent Weight Remaining | |
| P.D. | P.D./Hexa (a) | P.D./Melamine (b) |
| resorcinol (OH, OH) | 30 | 58 |
| resorcinol monobenzoate | 52 | 49 |
| 1,3,5-trihydroxybenzene | 44 | 59 |

(a) 3:1 mole ratio phenolic derivative to hexamethylenetetramine
(b) 3:1 mole ratio phenolic derivative to hexamethoxymethylmelamine These values represent the relative reactivity of the resin components and the volatility of the resin itself at 400° C. As it can be seen, certain phenolic derivatives that have low volatility react with the methylene donor to lesser extents than resorcinol or provide resins that are relatively volatile, and thus, not useful.

EXAMPLE 3

Preparation of Resorcinol Mono-Rosinate (Mono-Abietate)

A 1-liter, 3-necked, round bottomed flask was fitted with a heating mantle, pot thermometer, and a Dean-Stark water trap attached to a reflux condenser. The flask was charged with 150 g (0.50 mole) of tall oil rosin, 55 g (0.50 mole) of resorcinol, and 10 g of p-toluenesulfonic acid in 224 ml of m-xylene. The reaction mixture was heated to 148° C. The reaction product precipitated on the flask walls as water removal started. The stoichiometric amount of water was removed in about 5 hours. The reaction mixture was cooled and washed with a saturated sodium bicarbonate solution, then with water. The solvent was removed from the crude monoester by stripping under reduced pressure (approx. 10 mm Hg) at 60° C. The resulting dark brown solid (mp 68°–72° C.) was subjected to Gel Permeation Chromatography (GPC). GPC indicated attachment of resorcinol to the rosin acid.

EXAMPLE 4

Preparation of Phloroglucinol Mono-Rosinate (Mono-Abietate)

The preparation was carried out similar to that of the resorcinol mono-rosinate, except that 81 g (0.50 mole) of phloroglucinol dihydrate was used instead of resorcinol. A dark brown solid was obtained (mp 110°–125° C., softening approx. 70° C.). After the work-up, GPC analysis indicated attachment of phloroglucinol to the rosin acid.

EXAMPLE 5

Physical Testing

Adhesion was evaluated using the Tire Cord Adhesion Test (TCAT). Samples were prepared and tested according to the procedures described by D. W. Nicholson, D. I. Livingston, and G. S. Fielding-Russell, *Tire Science and Technology* (1978) 6, 114; G. S. Fielding-Russell and D. I. Livingston, *Rubber Chemistry and Technology* (1980) 53, 950; and R. L. Rongone, D. W. Nicholson and R. E. Payne, U.S. Pat. No. 4,095,465 (June 20, 1978).

Table III shows the basic rubber compound prepared in a two-stage Banbury mix used in this work. All parts and percentages are by weight unless otherwise noted.

TABLE III

| Rubber Compound Used In Adhesion Tests | |
|---|---|
| Material | Parts By Weight |
| Cis-1,4-polyisoprene | 100.0 |
| Peptizer | 0.05 |
| Carbon black | 60.0 |
| Processing oils | 4.6 |
| Cobalt salt of monocarboxylic acid (10% cobalt) | 3.0 |
| Antioxidant | 0.75 |
| Retarder | 0.1 |
| Fatty Acids | 2.0 |
| Zinc oxide | 8.0 |
| Sulfenamide accelerator | 1.2 |
| Sulfur | 2.4 |

Experimental samples were prepared using the masterbatch of Table III and mill mixing the required amounts of the resin components (i.e. resorcinol, resorcinol monobenzoate, and hexamethoxymethylmelamine). Resorcinol monobenzoate was added as a 1:1 weight replacement and a 1:1 mole replacement for resorcinol. The cure data for the experimentals and the controls were obtained using an oscillating disc rheometer at 150° C. and is set out in Table IV.

TABLE IV

| Physical Properties of Rubber Compounds | | | | | | | |
|---|---|---|---|---|---|---|---|
| Resin System # | Compound | phr resin | $t_2^{(b)}$ (min) | $t_{90}$ (min) | $S^{(e)}$ | $G'^{(c)}$ REL | $G''^{(d)}$ REL |
| (1) | None | — | 7.8 | 19 | 30.5 | 1.00 | 1.00 |
| (2) | Resorcinol (Res) | 2 | 5.6 | 35 | 17.5 | 1.16 | 2.16 |
| (3) | Resorcinol Monobenzoate (RMB) | 2 | 5.3 | 17 | 28.3 | 1.07 | 2.21 |
| (4) | Resorcinol Monobenzoate | 3.9 | 5.4 | 15.5 | 27.0 | 0.75 | 0.62 |
| (5) | Resorcinol/Hexa* | 2/2 | 3.4 | 22.7 | 34.5 | 0.89 | 0.77 |
| (6) | Resorcinol Monobenzoate/Hexa* | 2/2 | 4.0 | 17 | 41.5 | 1.57 | 2.42 |
| (7) | Resorcinol Monobenzoate/Hexa* | 3.9/2 | 3.3 | 20 | 40.8 | 1.83 | 1.55 |
| (8) | Resorcinol/Melamine** | 2/2 | 4.2 | 37.5 | 20.5 | 1.00 | 1.14 |
| (9) | Resorcinol Monobenzoate/Melamine** | 2/2 | 8.0 | 41 | 29.3 | 1.17 | 1.40 |
| (10) | Resorcinol Monobenzoate/Melamine** | 3.9/2 | 6.9 | 42 | 33.0 | 1.62 | 1.37 |

*Hexa = hexamethylenetetramine
**Melamine = hexamethoxymethylmelamine
(b)Oscillating disc rheometer at 150° C.
(c)Rheometrics System IV at 0.2% strain, 0.1 $H_z$, room temperature. G'REL = values relative to compound 1, G'(1) = 2.89 MPa. Compounds cured to $t_{90}$.
(d)Rheometrics System IV at 2% strain, 0.1 $H_z$, room temperature. G"REL = values compared to compound 1, G"(1) = 0.171 MPa. Compounds cured to $t_{90}$.
(e)S is the change in torque from lowest point to highest point upon curing.

Addition of resorcinol (Res) or resorcinol monobenzoate (RMB) alone (compounds 2-4) resulted in a decreased scorch time ($t_{\Delta 2}$) and $\Delta S$. For compounds 3, 4, 6 and 7 a slight reduction in cure time (t90) is observed, which is not the case upon addition of resorcinol. For RMB/Hexa compounds 6 and 7 t90 values are slightly shorter, scorch times are comparable and S values are significantly increased compared to the Res/Hexa compound, #5. For RMB/Melamine compounds t90 values are increased about 10% compared to Res/Melamine compounds; however, scorch time and delta torque values are favorably increased. The only significant difference in compound cure properties for resorcinol monobenzoate incorporated on a weight versus a mole replacement basis appears to be the decrease in scorch times when resorcinol monobenzoate is added on a mole basis.

The increased delta torque values measured for the experimental compounds compared to resorcinol controls parallel the results obtained from strain-sweep curves of dynamic viscoelastic measurements. Significant increases in G' values are obtained for RMB/Hexa (57-83%) and RMB/Melamine (17-62%) compounds compared to either Res/Hexa and Res/Melamine compounds, respectively, or to the control that contained no resin components (1), Table IV. Increases in G' values are reasonable estimates of relative compound reinforcement.

These data demonstrate that the instant invention provides a replacement of lower volatility than resorcinol that does not adversely impact on curing properties and in fact enhances certain desirable physical properties. One important aspect of this invention is the unexpected result that these phenolic esters did not adversely affect curing of the rubber and that unexpectedly, certain final rubber vulcanizate properties were improved.

EXAMPLE 6

Using the formulations set forth in Table III, tire cords were embedded in the rubber and cured as per the referenced TCAT publications. Table V sets forth the resin system incorporated, the parts per hundred and pullout force required for original and aged samples.

TABLE V

| Tire Cord Adhesion Test Data with RMB$^{(a)}$ | | | |
|---|---|---|---|
| | | Pullout Force (N)$^{(b)}$ | |
| Resin System | phr | Original | Aged$^{(c)}$ |
| Res/Melamine$^{(d)}$ | 2,2 | 205 | 167 |
| RMB/Melamine | 2,2 | 304 | 190 |
| RMB/Melamine | 3.9,2 | 302 | 273 |
| RMB/Melamine | 2.65,1.35 | 280 | 268 |

(a)Cured for 35 min at 155° C.
(b)Average of two average pullout force values.
(c)20 days at 120° C. under Nitrogen.
(d)Melamine - hexamethoxymethylmelamine.

Table V demonstrates the unexpected increase in adhesion to a tire cord that is imparted to a vulcanized rubber when a phenolic ester of this invention is used to replace resorcinol.

Adhesion data of the compounds using resorcinol monobenzoate show significant increases (about 50%) in pullout force required, compared to a resorcinol formulation in both original and nitrogen heat age samples.

EXAMPLE 6

Wire Adhesion for RMB/Hexa

Using the formulation set forth in Table VI, tire wire was embedded in the rubber and cured as per the referenced TCAT publication. Table VII sets forth the resin system incorporated, the parts per hundred and pullout force required.

TABLE VI

| Rubber Compound Used in Adhesion Tests | |
|---|---|
| Material | Parts by Weight |
| SBR | 100.0 |
| Peptizer | 0.25 |
| Fillers | 140.0 |
| Processing Oils | 25.0 |
| Fatty Acid | 3.0 |
| Zinc Oxide | 5.0 |
| Sulfenamide Accelerators | 1.22 |
| Sulfur | 4.0 |
| | 278.47 |

TABLE VII

Wire Adhesion Data for Resorcinol Monobenzoate (RMB)/Hexa* Compounds

| Resin System | PHR | Original Pullout Force, Newtons TCAT |
|---|---|---|
| Res/Hexa* | 2.5/1.5 | 516 |
| RMB/Hexa | 2.5/1.5 | 564 |
| RMB/Hexa | 2.5/1.0 | 627 |
| RMB/Hexa | 2.5/2.0 | 608 |
| RMB/Hexa | 3.0/1.5 | 499 |

*Hexa = hexamethylenetetramine

Those skilled in the art of compounding will appreciate that certain adjustments (i.e. cure variations) might be required when using the phenolic esters in specific rubber formulations.

EXAMPLE 7

Use of Resorcinol Mono-Rosinate and Phloroglucinol Mono-Rosinate

The phenolic esters prepared in Examples 3 and 4 were evaluated in a basic rubber compound. Table VIII sets out the compound.

TABLE VIII

Rubber Compound Used for Evaluating Rosinates

| Material | Parts by Weight |
|---|---|
| cis-1,4-polyisoprene | 70.0 |
| SBR 1778 (emulsion SBR, 23.5% bound styrene, 37.5 parts napthenic oil) | 41.25 |
| Carbon black | 50.0 |
| Processing oil | 6.0 |
| Fatty acids | 0.5 |
| Zinc oxide | 3.0 |
| Sulfenamide Accelerator | 0.8 |
| Sulfur | 2.3 |

Experimental samples were prepared using the masterbatch of Table VIII and mill mixing the required amounts of the resin components (i.e. resorcinol, resorcinol mono-rosinate, phloroglucinol mono-rosinate and hexamethylenetetramine). The cure data for the experimentals and the control were obtained using the procedures described for Table IV, and the dynamic mechanical properties for the vulcanizates were measured on the Goodyear Forced Resonance Vibrotester. For more information see S. D. Gehman et al, Ind. Eng. Chem. 33, 1032 (1942) and S. D. Gehman, *Rubber Chem. Technology* 30, 1202 (1957).

ing temperatures can be achieved, and unexpectedly, greater reinforcement of the rubber and greater adhesion by the rubber to structural reinforcement is realized without adversely affecting processing or final vulcanizate properties. This invention is completely unexpected since the prior art is devoid of any teaching that phenolic esters, specifically monobenzoate and rosinate can function as a methylene acceptor in a resin forming reaction.

We claim:

1. A vulcanizable rubber composition comprising rubber, a vulcanizing agent and the reaction product of (A) a methylene donor and (B) a methylene acceptor selected from at least one compound of the general structural formula (I):

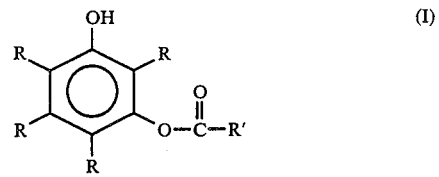

wherein R may be the same or different radicals selected from the group consisting of hydrogen, halogen, alkyl of 1 to 18 carbon atoms, alkoxy of 1 to 18 carbon atoms, and hydroxyl:

wherein R' is an aromatic radical the structural formula:

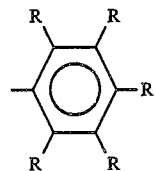

wherein R is defined as above;
or a radical of the structural formula:

TABLE IX

| Resin System | phr resin | T$_2$ min. | T$_{90}$ min. | S | tensile strength, MPa | Elong. at break % | 300% Mod. MPa | 100% Mod. | Rheovibron* at 11 Hertz tan | 60° C. E'MPa | Vibro tan | 100° C. MPa Mod. |
|---|---|---|---|---|---|---|---|---|---|---|---|---|
| Resorcinol | .75 | 7.1 | 16.1 | 31.5 | 17.0 | 480 | 8.6 | 1.9 | .078 | 4.3 | .08 | 6.9 |
| Hexamethylene-tetramine | 1.5 | | | | | | | | | | | |
| Resorcinol mono-rosinate | 2.6 | 7.2 | 15.9 | 29.1 | 18.0 | 540 | 7.4 | 1.8 | .083 | 4.1 | .09 | 6.0 |
| Hexamethylene-tetramine | 1.5 | | | | | | | | | | | |
| Phloroglucinol mono-rosinate | 3.0 | 7.9 | 17.7 | 29.8 | 18.0 | 570 | 6.8 | 1.8 | .095 | 4.9 | .12 | 7.5 |
| Hexamethylene-tetramine | 1.5 | | | | | | | | | | | |

*Rheovibron Viscoelastometer

INDUSTRIAL APPLICABILITY

Through the use of the instant invention, significantly lower emissions of organic materials at tire manufactur-

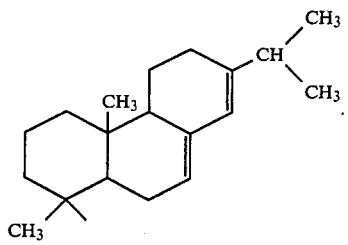

2. A vulcanizable rubber composition according to claim 1 wherein the methylene donor is hexamethoxymethyl melamine and R is hydrogen and R' is the radical

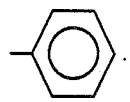

3. The composition according to claim 1 wherein the methylene donor is hexamethylenetetramine.

4. The composition according to claim 1 wherein the concentration of the methylene acceptor is from 1 to 10 parts per hundred of the rubber.

5. The composition according to claim 1 wherein the rubber is selected from the group comprising natural rubber, polybutadiene, cis-1,4-polyisoprene, polychloroprene, nitrile, butadiene/styrene copolymers, ethylene/propylene copolymers, ethylene/propylene/diene terpolymers, polyepichlorohydrin terpolymers, acrylic and fluoroelastomers, unsaturated and saturated block polymers, and blends thereof.

6. A vulcanized rubber article reinforced with a textile fiber or wire cord and prepared from the vulcanizable rubber composition of claim 1.

7. The composition according to claim 1, containing in addition thereto, carbon black.

8. A composition for the adhesion of a textile fiber or a steel cord to rubber which consists essentially of (1) a vulcanizable natural or synthetic rubber, (2) a sulfur vulcanizing agent, (3) from about 0.5 to about 50 parts by weight per 100 parts by weight of rubber of a methylene donor, and (4) from about 0.5 to about 50 parts by weight per 100 parts by weight of rubber of a phenolic ester methylene acceptor compound represented by the formula:

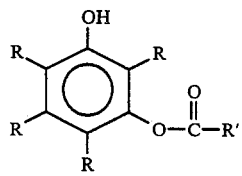

wherein each R represents, individually, hydrogen, halogen, alkyl of 1 to 18 carbon atoms, alkoxy of 1 to 18 carbon atoms or hydroxyl;
and wherein R' is an aromatic radical the structural formula:

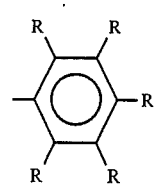

wherein R is defined as above; or a radical of the structural formula:

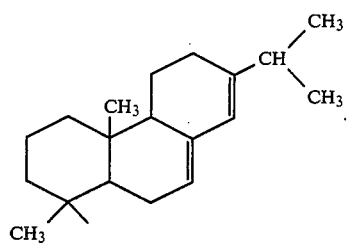

9. The composition according to claim 8 wherein the methylene donor is selected from the group consisting of hexamethylenetetramine, hexamethoxymethylmelamine, lauryloxymethylpyridinium chloride, ethyloxymethylpyridinium chloride, trioxan hexamethylolmelamine and paraformaldehyde.

10. The composition according to claim 8 which contains, in addition to the components thereof, carbon black, an antioxidant, zinc oxide and processing oil.

11. A vulcanizable rubber composition comprising rubber, a vulcanizing agent and filler, the improvement which is characterized by incorporating into the rubber composition an effective adhesion promoting amount of (A) a methylene donor and (B) a methylene acceptor selected from at least one compound of the structural formula:

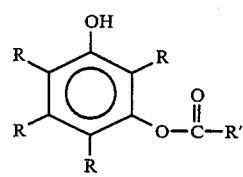

(I)

wherein R may be the same or different radicals selected from the group consisting of hydrogen, halogen, alkyl of 1 to 18 carbon atoms, alkoxy of 1 to 18 carbon atoms, and hydroxyl:
wherein R' is an aromatic radical the structural formula:

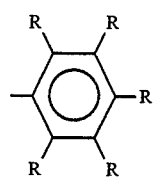

wherein R is defined as above;
or a radical of the structural formula:

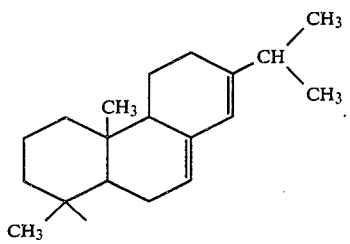

12. A vulcanizable rubber composition according to claim 11 wherein the methylene donor is hexamethoxymethyl melamine and R is hydrogen and R' is the radical

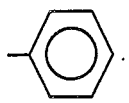

13. The composition according to claim 11 wherein the methylene donor is hexamethylene tetramine.

14. The composition according to claim 11 wherein the concentration of the methylene acceptor is from 1 to 10 parts per hundred of the rubber.

15. The composition according to claim 11 wherein the rubber is selected from the group comprising natural rubber, polybutadiene, cis-1,4-polyisoprene, polychloroprene, nitrile, butadiene/styrene copolymers, ethylene/propylene copolymers, ethylene/propylene/diene terpolymers, polyepichlorohydrin terpolymers, acrylic and fluoroelastomers, unsaturated and saturated block polymers, and blends thereof.

16. A vulcanized rubber article reinforced with a textile fiber or wire cord and prepared from the vulcanizable rubber composition of claim 11.

17. The composition according to claim 11, containing in addition thereto, carbon black.

18. A vulcanizable rubber composition comprising rubber, a vulcanizing agent and the reaction product of (a) a methylene donor and (B) resorcinol monobenzoate.

19. A vulcanizable rubber composition comprising rubber, a vulcanizing agent and the reaction product of (a) a methylene donor and (B) a methylene acceptor selected from resorcinol rosinate or phloroglucinol mono-rosinate.

* * * * *

UNITED STATES PATENT AND TRADEMARK OFFICE
CERTIFICATE OF CORRECTION

PATENT NO. : 4,605,696
DATED : August 12, 1986
INVENTOR(S) : Benko et al

It is certified that error appears in the above-identified patent and that said Letters Patent is hereby corrected as shown below:

In Column 12, at line 29, please delete the sentence "wherein R' is an aromatic radical the structural for-" and insert therefor --wherein R' is an aromatic radical of the structural for- --.

In Column 13, at line 67, please delete the sentence "and wherein R' is an aromatic radical the structural" and insert therefor --and wherein R' is an aromatic radical of the structural--.

In Column 14, at line 56, please delete the sentence "wherein R' is an aromatic radical the structural for-" and insert therefor --wherein R' is an aromatic radical of the structural for- --.

Signed and Sealed this

Eighth Day of December, 1987

Attest:

DONALD J. QUIGG

*Attesting Officer*  *Commissioner of Patents and Trademarks*